Nov. 7, 1950     F. J. HUBER     2,528,518
TRUE AIR-SPEED COMPUTER
Filed Nov. 29, 1949     2 Sheets-Sheet 1

INVENTOR.
FRANZ J. HUBER

Nov. 7, 1950 F. J. HUBER 2,528,518
TRUE AIR-SPEED COMPUTER
Filed Nov. 29, 1949 2 Sheets—Sheet 2

INVENTOR.
FRANZ J. HUBER
BY Wade Koontz
ATTORNEY
H. H. Losche
AGENT

Patented Nov. 7, 1950

2,528,518

UNITED STATES PATENT OFFICE 2,528,518

TRUE AIR-SPEED COMPUTER

Franz J. Huber, Dayton, Ohio

Application November 29, 1949, Serial No. 129,993

5 Claims. (Cl. 235—84)

(Granted under the act of March 3, 1883, as amended April 30, 1928; 370 O. G. 757)

The invention described herein may be manufactured and used by or for the United States Government for governmental purposes without payment to me of any royalty thereon.

This invention relates to air-speed computers and more particularly to air-speed computers using instrument readings, as in aircraft, or the like, of the indicated air speed, the indicated air temperature, and the indicated pressure altitude to compute the exact Mach number, true air speed, and temperature rise at the thermometer, taking into account the compressibility and the temperature rise at the thermometer, with only two computer settings.

A number of air-speed computers are known that are useful in computing the actual true air speed, or the like, but disadvantages are recognized in these computers in that they require the true free air temperature for making the computations, which differs from the air temperature indicated by the thermometer, the only air temperature available aboard an aircraft, and they require more than two computer settings. As a result, if the true air temperature is guessed for making computations and this temperature proves to be incorrect, a second computation with a better approximation of the true air temperature is necessary. Thus, the computation is lengthy and strenuous to the airmen and is not exact due to the trial and error method.

In accordance with the present invention, a true air-speed computer is provided for aircraft or the like, that utilizes instrument readings of the indicated air speed, indicated free air temperature, and indicated altitude in making true-air-speed computations. The computer has only three parts consisting of a large disk, a small disk rotative concentrically with respect to the large disk, and a transparent arm with a hairline thereon rotatable over the faces of the disks. The large disk has Mach number, temperature rise, true air speed, and indicated air-speed scales and a reference line for temperature setting thereon while the small disk has a pressure altitude scale and an index for indicated air temperature thereon. The scales on the two disks are coordinated to provide the proper computed results from various scale settings. Since the indicated pressure altitude is actually a static pressure reading calibrated in feet altitude for convenience and since the indicated air speed is actually an impact pressure reading calibrated in miles per hour or knots for convenience, the ratio of impact pressure to the static pressure is used in the present air-speed computer to directly determine the Mach number in view of the Mach number depending only on the ratio of these two pressures.

Once the Mach number is determined, the true air speed is a function only of the true air temperature or of the indicated air temperature and the given thermometer coefficient. To consider compressibility and temperature rise in the computation of the true air speed, the graduation of the indicated temperature scale has to vary with varying Mach number. This necessary variation of the graduation of the indicated temperature scale is achieved by relating the indicated air temperature curves on the temperature index on the small disk to the reference line made in the form of a spiral on the large disk and setting the hairline of the transparent arm over the indicated temperature at the spiral to read the true air speed under the hairline. It is therefore an object of this invention to provide a true air-speed computer that gives, with only two settings, an exact computation of the true air speed, Mach number, and temperature rise from the indicated air speed, indicated pressure altitude, and indicated air temperature, taking into consideration the compressibility of the air and the temperature rise at the thermometer by using a given thermometer coefficient.

These and other objects and advantages will become more apparent as the description proceeds when taken in conjunction with the accompanying drawings in which.

Figure 1:
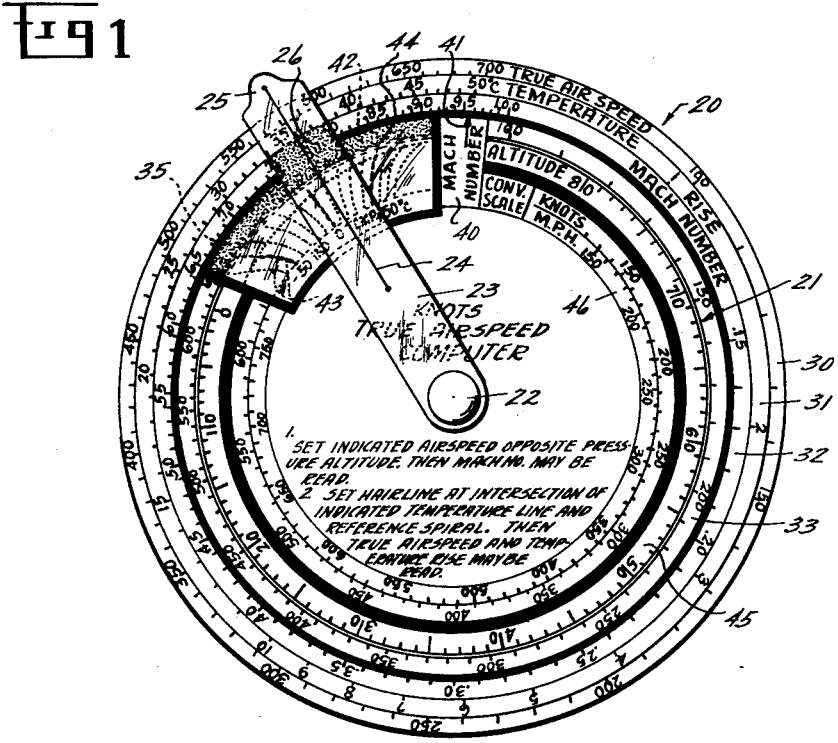
Fig. 1 shows a face view of the complete air-speed computer.

Referring now more particularly to Fig. 1, there is shown a large disk 20 and a small disk 21 rotatably mounted concentrically thereon by a pin 22. Pivotally mounted on the pin 22 is a transparent arm 23 having a visible hairline 24 extending from some point near the pivot outwardly to a handle portion 25. The transparent arm 23 is operable to be positioned in any radial direction over the faces of the disks 20 and 21 to position the hairline 24 radially as a visible reference line.

The large disk 20 is an unbroken circular disk that has concentric zonal scales on the face thereof. The outermost of these zonal scales is a true air-speed scale 30 in knots, the next adjacent radially inward zonal scale 31 provides temperature rise indicia in degrees centigrade, the third zonal scale radially inward provides a Mach number scale 32, and the intermost scale provides indicia for an indicated air-speed scale 33 in knots. In a zonal space 34 inwardly from the indicated air-speed scale 33 is a spiral reference line 35. The four scales and the spiral reference line are all coordinated in a manner later to be more fully described.

The small disk 21 has an extending portion 40 that is of radial extent to cooperate with the Mach number scale 32. The extended portion 40 carries an arrowhead 41 to provide accurate indication of the Mach number. To the left of the extended portion 40 is a window 42 that overlies a section of the zonal space 34 such that, as the small disk 21 is rotated with respect to the large disk 20, any portion of the spiral reference line 35 can be viewed. The window 42 is filled in with a transparent index sheet which has indicated temperature curves 43 thereon having a range from −60° to +70° centigrade. The window 42 has an opaque frame portion 44 which extends outwardly sufficiently to overlap the indicated air-speed scale 33. The small disk 21 has a peripheral zone with indicia marks between the extended portion 40 and the window 42 forming a pressure altitude scale 45 that is in cooperative slide rule relation with the indicated air-speed scale 33 on the large disk 20. For the purpose of convenience, a conversion scale 46 is positioned on the small disk to expedite the conversion of knots into miles per hour, and vice versa.

By using this true air-speed computer, the true air speed, temperature rise, and Mach number can be readily ascertained by setting the indicated air speed and pressure altitude in coincident relation on the scales 33 and 45 and by positioning the hairline 24 over the indicated temperature at the spiral reference line 35 which is graduated in temperature degrees by the curves 43. The transparent arm 23 has an opaque portion 26 that covers a section of the Mach number scale 32 to prevent inadvertent Mach number readings under the hairline; and the opaque window frame portion 44 covers a section of the indicated air-speed scale 33 to eliminate any possible reference to this scale when reading the true air speed and temperature rise under the hairline.

Pressure altitude scale 45 is actually a logarithmic pressure scale marked in pressure altitude according to the relationship between static pressure and altitude for standard atmosphere, and the indicated air-speed scale 33 is actually also a logarithmic pressure scale marked according to a stipulated relationship between impact pressure and indicated air speed. These two scales are completed with the pressure increasing clockwise for both scales such that when a pressure altitude mark is positioned opposite an indicated air speed mark the ratio of impact pressure to static pressure is defined by the position of the two disks relative to each other. Since the Mach number depends only on the ratio of these two pressures, the Mach number can immediately be read on the Mach number scale 32 for any set of conditions arranged as above described.

In order to properly relate the indices on the Mach number, indicated air speed, and indicated pressure altitude scales, these scales are calibrated mathematically in angular relation. This computer is calibrated for aircraft air-speed indicators which are operated by the Pitot pressure and static pressure of the free air stream and show the true air speed when flying at sea level standard atmosphere. The calibration formula used in textbooks for such air-speed indicators for the subsonic speed range is:

$$V_i = \sqrt{2JgC_pT_0\left[\left(\frac{P_{tot}}{P_0}\right)^{\frac{\gamma-1}{\gamma}} - 1\right]} \quad (1)$$

where:

$V_i$ is the indicated air speed,
$J$ is the mechanical heat equivalent,
$g$ is the acceleration of gravity,
$c_p$ is the specific heat of air at constant pressure,
$P_{tot}$ is the total pressure,
$P_0$ is the static pressure at sea level standard atmosphere,
$T_0$ is the absolute temperature, static sea level conditions, standard atmosphere, and
$\gamma$ is the ratio of the specific heats.

Since $P_{tot}$ equals $P_0+q_c$, where $q_c$ is the impact pressure, the equation may be written:

$$V_i = \sqrt{2JgC_pT_0\left[\left(1+\frac{q_c}{P_0}\right)^{\frac{\gamma-1}{\gamma}} - 1\right]} \quad (1')$$

From this equation it may be understood that $V_i$ is a function only of the impact pressure $q_c$ because it is the only variable on the right side of the equation.

The Mach number M is a function only of the ratio of impact pressure to static pressure, as shown by the following equation:

$$M = \sqrt{\frac{2}{\gamma-1}\left[1+\frac{q_c}{P}\right]^{\frac{\gamma-1}{\gamma}} - 1} \quad (2)$$

The values of the impact pressure as a function of the indicated air speed and the values of the static pressure as a function of the pressure altitude have been taken from recognized Aeronautical Specification Tables.

Figure 2:
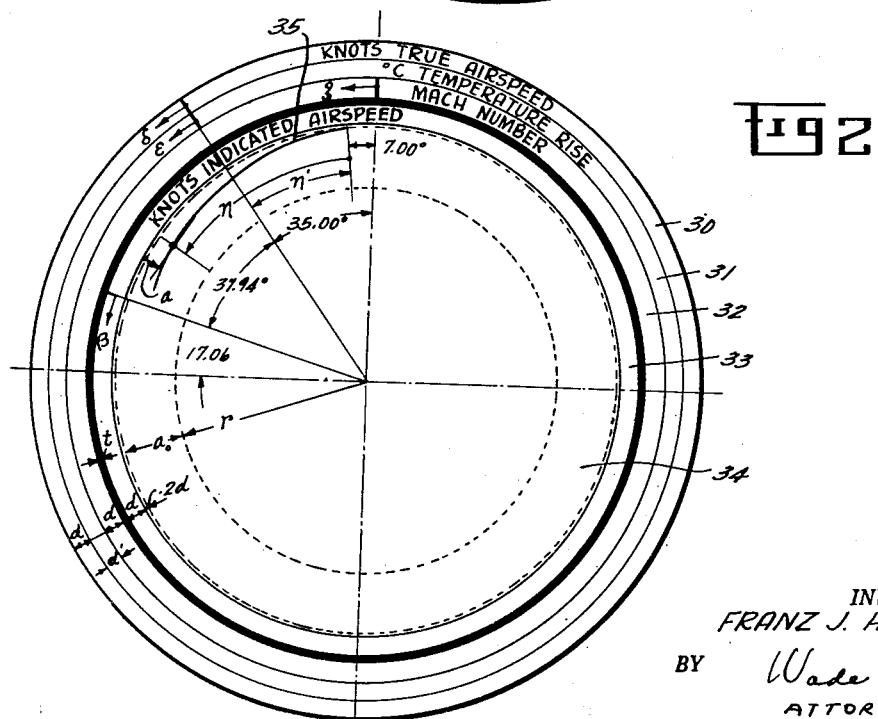
Fig. 2 illustrates a face plan view of the large disk of the computer showing the coordination of the scales.
Figure 3:
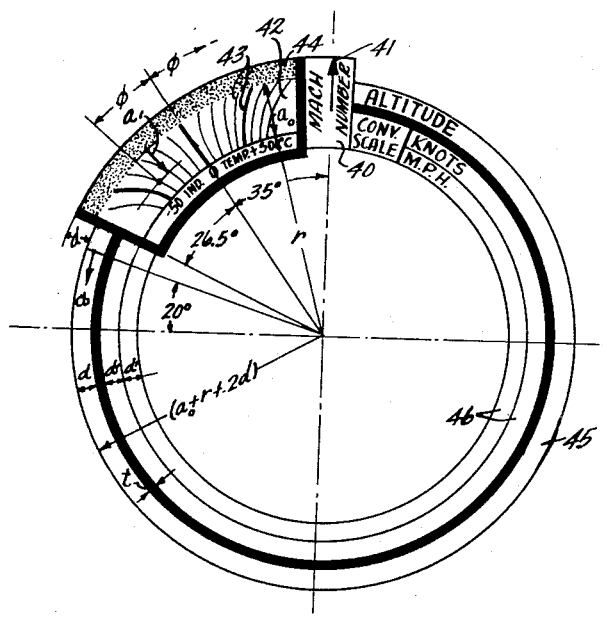
Fig. 3 illustrates a face plan view of the small disk of the computer showing the coordination of the scales.

In order to mark the scales on the two disks 20 and 21 to provide a coordinated scale relation, reference is made to the following equations and to Figs. 2 and 3. The pressure altitude scale is determined by the equation:

$$\alpha = C \log\left[\frac{P_{h_p=0}}{P_{h_p}}\right] = C \log\left[\frac{P_0}{P_{h_p}}\right] \quad (3)$$

where;

$\alpha$ is the angular coordinate in degrees for the pressure altitude 45,
$h_p$ is the pressure altitude, and
$C$ is a constant chosen to be numerically equal to 165 to obtain adequate length of the scale on the circular slide rule. The scale starts at $\alpha=0$, with $h_p=0$.

The indicated air speed scale 33 starting at $\beta=0$ with $V_i=650$ knots is then given by the equation:

$$\beta = C \log\left[\frac{(q_c)_{V_i=650\text{ knots}}}{(q_c)_{V_i}}\right] \quad (4)$$

where $\beta$ is the angular coordinate in degrees of the indicated air speed scale 33, and C is of the same numerical value as used in the above equation.

Since the Mach number scale 32 has to be coordinated with the logarithmic indicated pressure scale 45, the Mach number scale starting at $\xi=0$ with $M=1.0$ is given by the equation:

$$\xi = C \log \left[ \frac{\left(\frac{qc}{p}\right)M=1}{\left(\frac{qc}{p}\right)M} \right] \quad (5)$$

where P is the static pressure.

By substituting equivalents from Equation 2 the equation becomes:

$$\xi = C \log \left[ \frac{\left(\frac{\gamma+1}{2}\right)^{\frac{\gamma}{\gamma-1}} - 1}{\left(\frac{\gamma-1}{2}M^2+1\right)^{\frac{\gamma}{\gamma-1}} - 1} \right] \quad (6)$$

and by assigning numerical values to the known terms, this equation becomes:

$$\xi = 165 \log \left[ \frac{0.89293}{(0.2M^2+1)^{3.5}-1} \right] \quad (6')$$

The coordination of the scales 32, 33, and 45 can be checked for correctness by positioning the arrow head 41 at the Mach number 1.0 which should position the zero indication of the pressure altitude scale 45 at 660.8 knots on the indicated air speed scale 33. That is, $M=1.0$ when $$V_i = 660.8 \text{ knots and } h_p = 0 \text{ ft.}$$

For a given Mach number the true air speed is a function only of the true free air temperature, and when the thermometer coefficient is given the true air speed is only a function of the indicated air temperature. As derived from the following equation:

$$V_{tr} = M\sqrt{g\gamma R T_{tr}}$$

where;

$V_{tr}$ is the true air speed,
R is the gas constant, and
$T_{tr}$ is the absolute true air temperature. The true air temperature is given by the indicated air temperature $T_i$ and the thermometer coefficient $c_{th}$ by $$T_{tr} = T_i - c_{th}\left(\frac{V_{tr}^2}{2Jgc_p}\right)$$

From the two above equations the resulting equation is obtained:

$$V_{tr} = \sqrt{\frac{g\gamma R M^2 T_i}{1 + C_{th}\frac{\gamma-1}{2}M^2}} \quad (7)$$

or $$M^2 = \frac{V_{tr}^2}{g\gamma R T_i - C_{th}\frac{2}{\gamma-1}V_{tr}^2} \quad (7')$$

Then, there may be derived an expression for the true air speed scale 30, for a constant indicated temperature, $T_i$ starting at $\delta=0$ with $M=1.0$ where $\delta$ is the coordinate in angle degrees of the true air speed scale :

$$\delta = C \log \left[ \frac{\left(\frac{\gamma+1}{2}\right)^{\frac{\gamma}{\gamma-1}}-1}{\left(\frac{V_{tr}^2}{2\frac{\gamma}{\gamma-1}gRT_i - C_{th}V_{tr}^2}+1\right)^{\frac{\gamma}{\gamma-1}}-1} \right] \quad (8)$$

By substituting numerical values for $V_{tr}$ in knots, an assumed indicated temperature $T_i = T_i' = 273°$ $K \equiv t_i' = 0°$ centigrade, and a thermometer coefficient of $c_{th}=0.8$, the results of $\delta$ will be in degrees:

$$\delta = 165 \log \left[ \frac{0.89293}{\left(\frac{V_{tr}^2}{2069900-0.8V_{tr}^2}+1\right)^{3.5}-1} \right] \quad (8')$$

The coordination of this true air speed scale 30 to the Mach number scale 32 is correct if $\delta=0$ is indicated when Mach number $M=1.0$ is set at the arrow head 41. The true air speed can now be read on the true air speed scale 30 directly only for an indicated temperature $t_i = t_i' = 0°$ centigrade. For a constant Mach number the true air speed varies only with the indicated temperature according to Equation 7 and the change in the true air speed in terms of $\delta$ caused by a change of indicated temperature from $T_i'$ to $T_i$ can be calculated from Equations 7 and 8 and the following equation where $\phi=(\delta)T_i-(\delta)T_i'$ gives the coordinate in angle degrees for the indicated temperature scale 43 to be plotted on the transparent window sheet 42:

$$\phi = (\delta)T_i - (\delta)T_i' = C \log \left[ \frac{\left(\frac{\gamma-1}{2}M^2+1\right)^{\frac{\gamma}{\gamma-1}}-1}{\left(\frac{T_i M^2}{C_{th}M^2(T_i'-T_i)+\frac{2}{\gamma-1}T_i'}+1\right)^{\frac{\gamma}{\gamma-1}}-1} \right] \quad (9)$$

substituting numerical values with $c_{th}=0.8$ and $T_i'=273°$ $K \equiv t_i'=0°$ centigrade:

$$\phi = 165 \log \left[ \frac{(0.2M^2+1)^{3.5}-1}{\left(\frac{T_i M^2}{0.8M^2(273-T_i)+1365}+1\right)^{3.5}-1} \right] \quad (9')$$

From this equation it may be seen that the graduation $\phi$ of the indicated temperature scale 43 varies when the Mach number changes. This varying graduation is accomplished by means of the reference line 35 shifting in radial direction when the Mach number changes as compared with the temperature curves 43 on the transparent index sheet in the window 42 with which it cooperates. Various curves for the reference line 35 can be used, but for the purpose of illustrating the invention a spiral for the reference line 35 is used which gives convenient indicated temperature curves and is defined by the equation:

$$a = r[0.26-(0.51-0.00128n)^2] \quad (10)$$

where:

$a$ is the variable radial coordinate and is measured inward from the circle of radius $(a_0+r) = 1.25r$, $r$ is the reference radius for the reference line 35, and $n$ is the coordinate in angle degrees of the reference spiral 35.

An equation coordinating the reference spiral 35 with the Mach number is given by:

$$a_1 = r\{0.26-[0.51-0.00128(\xi+\phi+n')]^2\} \quad (11)$$

where $n'$ is a constant value taken as 28° for coordinating the scales. The angle $\xi$ can be obtained from Equation 6 and the angle $\phi$ can be obtained from Equation 9. These two coordinates $\phi$ and $a_1$ with the indicated temperature $T_i$ as the parameter and the Mach number varying, define the temperature curves 43 for indicated temperature scale on the transparent sheet in the window 42.

The temperature rise scale 31 may be determined in the following manner. The temperature rise, indicated herein as $\Delta T$, at the thermometer for a given thermometer coefficient $c_{th}$ is a function of the true air speed only as shown by equations:

$$\Delta T = \frac{C_{th} V_{tr}^2}{2JgCp}$$

or  (12)

$$V_{tr}^2 = \frac{2JgCp\Delta T}{C_{th}}$$

The angle $\epsilon$ for determining the scale indices on the temperature rise scale 31 is found from the Equation 8 by substituting the true air speed $V_{tr}$ from Equation 12:

$$\epsilon = C \log \left[ \frac{\left(\frac{\gamma+1}{2}\right)^{\frac{\gamma}{\gamma-1}} - 1}{\left(\frac{\Delta T}{C_{th}(T_i' - \Delta T)} + 1\right)^{\frac{\gamma}{\gamma-1}} - 1} \right] \quad (13)$$

By substituting numerical values in the above equation, the equation becomes:

$$\epsilon = 165 \log \left[ \frac{0.89293}{\left(\frac{\Delta T}{0.8(273 - \Delta T)} + 1\right)^{3.5} - 1} \right] \quad (13')$$

The angles $\epsilon$ and $\delta$ are measured from the same radial line. The arm 23 is then used to position the hairline 24 over the indicated temperature at the scale 43, and for reading the temperature rise scale 31, and the true air speed scale 30.

The order inward or outward of the scales 30, 31, and 32 could be changed as desired, but the order shown and described is preferred to provide the least possible confusion in making computations and in reading the scales. The Mach number scale 32 could also be placed in a zonal area radially inward of the reference line 35 of disk member 20 and be read through a window in disk member 21 although such an arrangement is purely for satisfying personal taste. The computer can also be produced wherein the small disk 21 is partly transparent and substantially equal in diameter to the large disk 20 with the opaque portions positioned where it is not necessary to see the scale on the disk 20.

In order to better understand the operation of the true air speed computer described for this invention, an example will be given setting out one possible set of conditions, as for aircraft in flight. Referring again to Fig. 1, let it be assumed that the instruments register an indicated air speed of 450 knots (or if in miles per hour the conversion scale may be used to convert miles per hour to knots), that the indicated pressure altitude is 20,000 feet, and that the indicated temperature reading is +10° C. The first step requires that the two disks 20 and 21 should be rotated relatively until 450 on the indicated air speed scale 33 is opposite 20 on the pressure altitude scale 45. The Mach number may be readily determined on the Mach number scale 32 at the position of the arrowhead 41. For the above setting the Mach number may be read as 0.952. The second step requires rotating the transparent arm 23 over the face of the disks until the hairline 24 rests over the intersection of the +10° indicia curve on the indicated temperature scale 43 and the spiral reference line 35. The exact true air speed can then be readily determined from the true air speed scale 30 under the hairline as being 583 knots, and the temperature rise is readily read on its scale 31 under the hairline to be 35.9° C. By the arrangement of the indicated temperature indices 43 and the spiral reference line 35 the compressibility of the air and the temperature rise at the thermometer due to the deceleration of the air is accounted for in the computations. Hence, for correctly indicating instruments there is no error involved in determining the exact true air speed, Mach number, and temperature rise.

As in the subsonic speed range, it is also true in the supersonic speed range that the Mach number depends only on the ratio of the Pitot pressure less static pressure to static pressure. Therefore, by using the formulas for supersonic speed the true air speed slide rule computer principle as herein above described can also be applied for supersonic speeds provided the air speed indicator is properly operated as for subsonic speeds.

In the subsonic speed range for a given airplane with the Pitot static tube a sufficient distance ahead of the fuselage nose, Mach number depends only from the ratio of the measured Pitot pressure less measured static pressure to the measured static pressure (neglecting the very small influence of changing angle of attack due to changes in airplane weight and air density). The Pitot static tube can be mounted on any airplane at such a location ahead of the fuselage nose that the measured static pressure deviates only in the subsonic speed range and only a small amount from the static pressure in the undisturbed air stream and that this deviation is very much the same for all airplanes and that there is no error in the Pitot pressure. A true air speed computer constructed in accordance with the principle described above could therefore be made for the subsonic speed range such that it includes the "position error."

In the supersonic speed range there is no "position error" as soon as the compression wave passes the static pressure holes which occurs very soon above the sonic speed when the Pitot static tube is mounted in front of the fuselage.

In a small region around the sonic speed for a measured pressure ratio more than one Mach number can be possible. Therefore, it is not possible to build a true air speed computer including the subsonic and supersonic speed ranges which includes the "position error" and has steady and unique scales in the transonic speed range. Therefore, it is advised either to base the true air speed computer scales throughout the subsonic and supersonic speed ranges on the theoretical pressure ratios and to use a correction for the "position error" in the subsonic speed range, or to use a true air speed computer which for the subsonic speed range includes the "position error" and for the supersonic speed range is based on the theoretical pressure ratio since there is no "position error." This can be achieved by an unsteadiness in the curves on the temperature index. When flying close to sonic speed it is first to be made sure whether one flies in the subsonic speed range or in the supersonic speed range which should not be too difficult.

While I have shown and described a preferred embodiment of my invention, it is to be understood that various modifications and changes may be made without departing from the spirit and scope of my invention and I desire to be limited only by the scope of the appended claims.

I claim:

1. A true air-speed computing slide rule comprising; two relatively slidable members; a first logarithmic scale expressing the impact pressure in terms of indicated air speed on one of said members; a second logarithmic scale expressing the static pressure in terms of pressure altitude on the other of said members, said first and second logarithmic scales each having the pressure increasing in the same direction; a third logarithmic scale on one of said members expressing the ratio of said impact pressure to said static pressure in terms of Mach number, said Mach number being indicated by a pointer on the other of said members; a reference line on said member having said Mach number scale and fixed with respect to said last-mentioned scale; an indicated temperature index on said member other than the member having the reference line thereon, said indicated temperature index comprising curves of constant temperature and being in cooperative relation with said reference line to form a temperature scale along said reference line the graduation of which varies with Mach number changes taking into account the exact consideration of the compressibility of the air and the temperature rise at the thermometer in computing the true air speed; a fourth scale fixed on said member having said Mach number scale thereon expressing the true air speed as a function of the indicated air temperature for computed Mach numbers; and means for reading said true air speed scale for various indicated air speed, pressure altitude, and indicated temperature scale settings.

2. A true air-speed computing slide rule as set forth in claim 1 wherein said two relatively slidable members are circular and centrally rotatably connected; said first scale, second scale, third scale, fourth scale, and reference line are in zonal areas of said members; said indicated temperature index is on a transparent zonal sector that is operable over the zonal area of said reference line; and said means for reading said true air-speed scale is a transparent arm rotatably mounted centrally over said circular members having a visible hairline thereon that is radially directed from the point of rotation of said arm.

3. A true air-speed computing slide rule device comprising; two relatively slidable members; a first logarithmic scale expressing the impact pressure in terms of indicated air speed according to the relationship between static pressure and altitude for standard atmosphere on one of said members; a second logarithmic scale expressing the static pressure in terms of pressure altitude on the other of said members, said first and second logarithmic scales each having the pressure increasing in the same direction; a third logarithmic scale on said one of said members expressing the ratio of said impact pressure to said static pressure in terms of Mach number, said Mach number being indicated by a pointer on said other of said members; a reference line on said one of said members fixed with respect to said Mach number scale; an indicated temperature index on said other of said members, said indicated temperature index comprising curves of constant temperature and being in comparative superimposed relation with said reference line to form a temperature scale on said reference line the graduation of which varies with Mach number changes taking into account exact consideration of the compressibility of the air and the temperature rise at the thermometer in computing the true air speed; a fourth scale fixed on said one of said members expressing the true air speed as a function of the indicated air temperature for computed Mach number; a fifth scale on said one of said members expressing the temperature rise as a function of the true air speed; and a positionable hairline for comparing the curves of indicated temperature on said temperature index with said reference line and said true air speed and temperature rise scales for various indicated temperature, pressure altitude, and indicated air-speed settings.

4. A true air-speed computing slide rule device as set forth in claim 3 wherein parts of said other of said members are transparent with scales thereon to be compared with areas of said one of said members.

5. A true air-speed computing slide rule device as set forth in claim 4 wherein said two relatively slidable members are substantially circular and relatively rotatable on a central common axis; said first, second, third, fourth, and fifth scales and said reference line are in zonal areas of said members, the reference line constituting a spiral; said indicated temperature index is on a transparent zonal sector portion of said other of said members operative to overlie any section of said zonal area of said spiral reference line; and said positionable hairline is carried in a transparent arm that is pivoted on the common axis of said members with said hairline extending radially whereby the relative adjustment of said members to bring a given indicated pressure altitude opposite a given indicated air speed and the positioning of said transparent arm such that the hairline passes over the given indicated temperature at said spiral reference line provides a direct and exact computation of the Mach number at said pointer and of the true air speed and temperature rise under the hairline.

FRANZ J. HUBER.

REFERENCES CITED

The following references are of record in the file of this patent:

UNITED STATES PATENTS

| Number | Name | Date |
| --- | --- | --- |
| 2,247,531 | Thurston et al. | July 1, 1941 |
| 2,342,674 | Kotcher | Feb. 29, 1944 |